Patented Mar. 6, 1923.

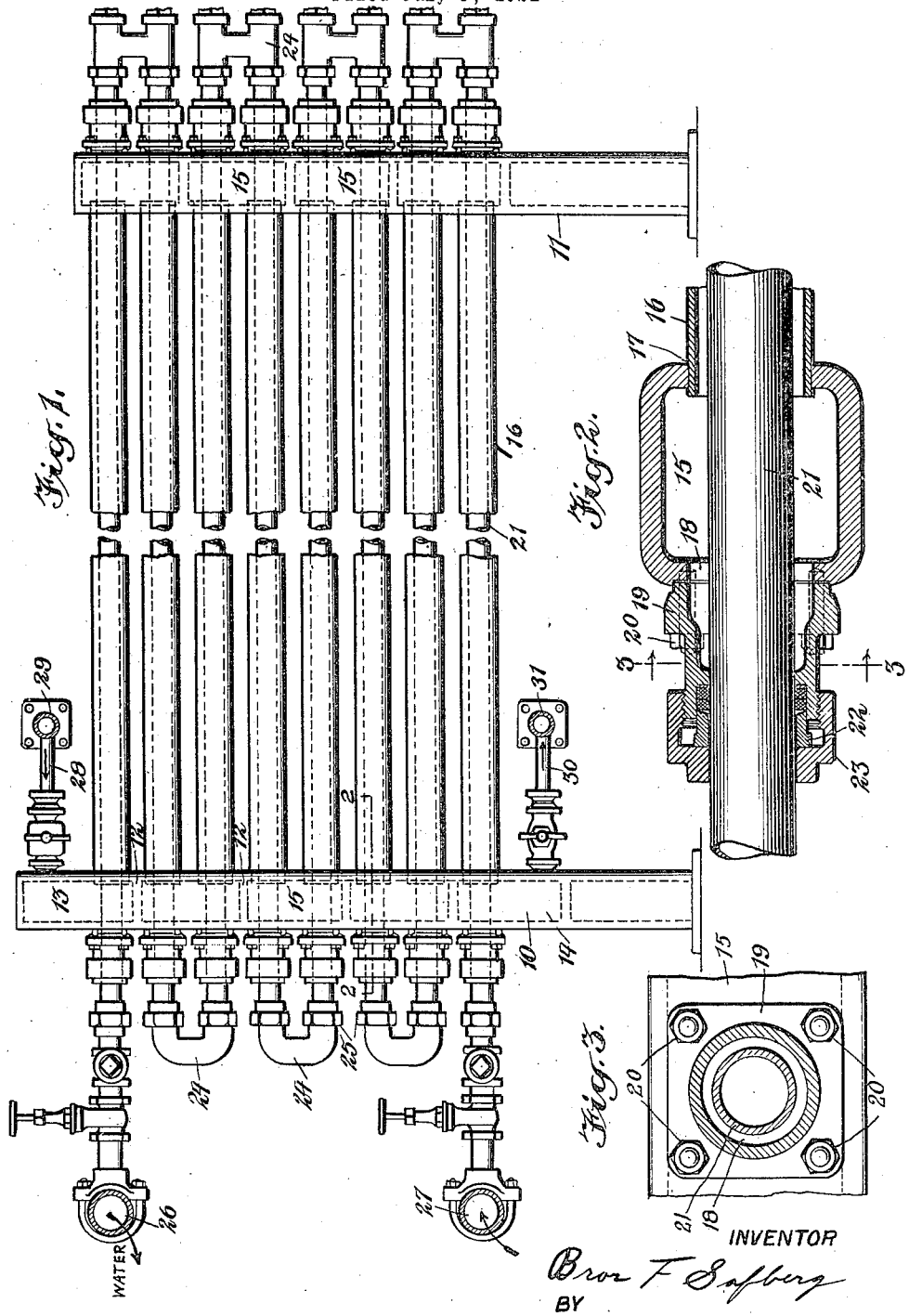

1,447,518

UNITED STATES PATENT OFFICE.

BROR F. SAFBERG, OF CARBONDALE, PENNSYLVANIA, ASSIGNOR TO CARBONDALE MACHINE COMPANY, OF CARBONDALE, PENNSYLVANIA, A CORPORATION OF PENNSYLVANIA.

DOUBLE-PIPE CONDENSER.

Application filed July 9, 1921. Serial No. 483,445.

*To all whom it may concern:*

Be it known that I, BROR F. SAFBERG, a citizen of the United States, and resident of Carbondale, in the county of Lackawanna and State of Pennsylvania, have invented certain new and useful Improvements in Double-Pipe Condensers, of which the following is a specification.

This invention is an improved double pipe condenser or counter current apparatus for the interchange of heat between two fluids, and although a preferred embodiment which I have designed is intended for use as an ammonia condenser, it is to be understood that the apparatus is not limited in its use to any particular fluids.

The main object of my invention is to so construct the headers and the means of supporting and connecting the concentric pipes, that a new outer pipe may be inserted in place of an old or defective one, by moving it endwise into place through the opposite walls of either header, and then secure it to both headers without moving the headers relatively to each other or disturbing the connections of the other outer pipes to the headers.

I accomplished this result by the use of stuffing boxes detachably secured on the outer walls of the headers and serving as supports for the inner pipes, and also as closures for openings in said outer walls, which openings are larger than the outer pipes.

In the accompanying drawings:—

Fig. 1 is a side elevation of a counter-current apparatus unit constructed in accordance with my invention, Fig. 2 is a section on the line 2—2 of Fig. 1 but on a larger scale, and Fig. 3 is a section on the line 3—3 of Fig. 2.

The unit shown includes a pair of wrought steel or cast iron headers 10 and 11 which may be of square or flattened form in cross section and provided with transverse partitions 12 dividing the interior space of these headers into a plurality of separate compartments. The upper compartment 13 in one of these headers may serve to receive the gas to be condensed and the lower compartment 14 in one of them may serve for the collection of the condensed liquid. The remaining compartments 15 each have a pair of apertures on each of two opposite sides and spaced apart lengthwise of the header. Outer pipes 16 project into the openings 17 on one side of each header and are expanded by a suitable expanding tool so as to fit the aperture gas tight and be rigid with the headers. The apertures 18 are in axial alignment with the corresponding apertures 17 and are slightly larger than the latter so that the outer pipes 16 may be moved lengthwise into place through the apertures 17 during the assembly of the parts, or when removing or inserting a pipe incidental to repair. Detachably secured in each of the apertures 18 is a stuffing box 19. I have shown these stuffing boxes held in place against a gasket by a plurality of screw bolts or studs 20, but I do not wish to be limited to any specific means of attaching or supporting, as it may be mounted in various different ways. The main tubes 21 project through these stuffing boxes and the joints are rendered gas tight by any suitable form of gland 22 and cap, or other nut 23. The stuffing boxes hold the inner pipes concentric with the outer pipes and the inner pipes are spaced from the opposite walls of the header to a sufficient extent to permit the free flow of the fluid from one outer pipe to another in the compartments or chambers 15. The partitions 12 are so located that the outer pipes are connected together in pairs and alternately at opposite ends so as to form a continuous path for a fluid through all of the outer pipes in succession.

The inner pipes 21 project beyond the stuffing boxes 19 and are connected together in series by any suitable form of return bends 24 secured to the ends of the inner pipes by unions 25 or in any other suitable manner. One end of the upper inner pipe may be connected to a transverse header 26 and one end of the lower inner pipe connected to a similar transverse header 27. One of these headers may serve as a water inlet header and the other as a water outlet header if the device be employed as a condenser.

The upper compartment 13 of one of the cast iron or wrought steel headers has an aperture to which is connected a branch pipe 28 from a gas inlet header 29. The lower compartment 20 is similarly connected by a branch pipe 30 to a condenser liquor outlet header. As one advantage of my improved construction, the apertures for these branch pipes 28 and 30 may be formed at any one of various points in the wall of the header. As illustrated, the branch pipes enter the header from the side opposite to the water headers 26 and 27, but it will be evident that these branch pipes may enter from the opposite sides or from what is the front or rear side as viewed in Fig. 1, or the branch pipe 28 might even enter the top of the compartment 13. These headers being substantially rectangular in cross section, and thus having four substantially flat walls, the gas and liquor connections may be made in any one of the walls to get the most convenient piping arrangement at the plant of the user. The outer pipes being expanded into the apertures 17 of the headers, are rigidly supported, and thus there are no packing gaskets or stuffing boxes needed for the outer pipes, and which might develop leaks. In case of repairs, the stuffing boxes for the inner pipes may be easily removed, and any one of the outer tubes may be removed without disturbing the others, or may be re-expanded. The stuffing boxes, being detachable from the header, may be removed and replaced by new ones at any time desired. The outer tubes may be brought very close together by reason of the simple form of supporting and connecting these pipes, which I employ. By supporting the outer pipes in the manner illustrated, it is not necessary to employ pipe supports or straps between the headers. The compartments in the headers allow full and ample space for the flow of the fluid from one outer pipe to the next, and thus higher efficiency is secured even with very close spacing of the outer tubes.

Having thus described my invention, what I claim as new and desire to secure by Letters Patent is:—

1. A heat interchanger including a header having openings in opposite walls thereof, an outer pipe having its end secured within one of said openings, a stuffing box detachably secured to the header and serving as a closure for the other of said openings and an inner pipe extending through said outer pipe, said openings and said stuffing box, said pipe, said openings and said stuffing box, said outer pipe being movable endwise into or out of position through said last mentioned opening, upon the removal of said stuffing box.

2. A countercurrent heat interchanger apparatus including a pair of headers substantially rectangular in cross section and each having a row of apertures in one wall and a row of apertures of larger size in the opposite wall, said headers being positioned with the walls having the smaller apertures facing toward each other, outer tubes each having its opposite ends expanded to fit a pair of said smaller apertures, stuffing boxes detachably secured to said headers at the larger aperture thereof in the outer sides to serve as closures for said apertures, and inner pipes projecting through the outer pipes, headers and stuffing boxes.

3. A countercurrent heat interchanger including a pair of headers substantially rectangular in cross section and having transverse partitions subdividing them into compartments, and each having a row of apertures in each of two opposite walls, outer pipes connecting said headers and each having its opposite ends expanded into corresponding apertures of said headers, stuffing boxes detachably secured at the apertures of said headers opposite to the ends of said outer pipes and serving as closures for said apertures, and inner pipes extending through said outer pipes and said stuffing boxes, said stuffing boxes being removable and said outer pipes being movable endwise into place through said last mentioned apertures in assembling the construction.

Signed at Carbondale in the county of Lackawanna and State of Pennsylvania this eighth day of June A. D. 1921.

BROR F. SAFBERG.